(No Model.) 3 Sheets—Sheet 1.

R. H. DUNDEE & F. G. JONES.
MACHINE FOR CRUSHING OR PULVERIZING ORES OR OTHER SUBSTANCES.

No. 566,672. Patented Aug. 25, 1896.

Witnesses. Inventors.

(No Model.) 3 Sheets—Sheet 2.

R. H. DUNDEE & F. G. JONES.
MACHINE FOR CRUSHING OR PULVERIZING ORES OR OTHER SUBSTANCES.

No. 566,672. Patented Aug. 25, 1896.

Witnesses. Inventors.

(No Model.) 3 Sheets—Sheet 3.

R. H. DUNDEE & F. G. JONES.
MACHINE FOR CRUSHING OR PULVERIZING ORES OR OTHER SUBSTANCES.

No. 566,672. Patented Aug. 25, 1896.

Witnesses. Inventors.

UNITED STATES PATENT OFFICE.

ROBERT HANDLEY DUNDEE AND FREDERICK GEORGE JONES, OF CORNWALL, ENGLAND.

MACHINE FOR CRUSHING OR PULVERIZING ORES OR OTHER SUBSTANCES.

SPECIFICATION forming part of Letters Patent No. 566,672, dated August 25, 1896.

Application filed January 27, 1896. Serial No. 577,050. (No model.) Patented in England February 28, 1895, No. 4,308.

*To all whom it may concern:*

Be it known that we, ROBERT HANDLEY DUNDEE and FREDERICK GEORGE JONES, subjects of the Queen of Great Britain, residing at Grampound, Cornwall, England, have invented new and useful Improvements in Machines for Crushing or Pulverizing Ores and other Substances, (which are partly protected in Great Britain by Letters Patent No. 4,308, dated February 28, 1895,) of which the following is a specification.

Our invention relates to improvements in machines for crushing or pulverizing quartz, ores, chemicals, and other substances and to machines of that class wherein a rotating cylinder having a vibrating hammer-block within it is employed and wherein a screen is arranged for separating the ground material from that which is only partially ground.

The object of our invention is to improve the construction of this machine; and it consists mainly in a novel arrangement of parts and in the provision of means whereby the partially-ground material is directed against the screen, and whereby the insufficiently-ground material is returned beneath the hammer-block to be further crushed.

To enable our invention to be fully understood we will describe the same by reference to the accompanying drawings, in which—

Figure 1:
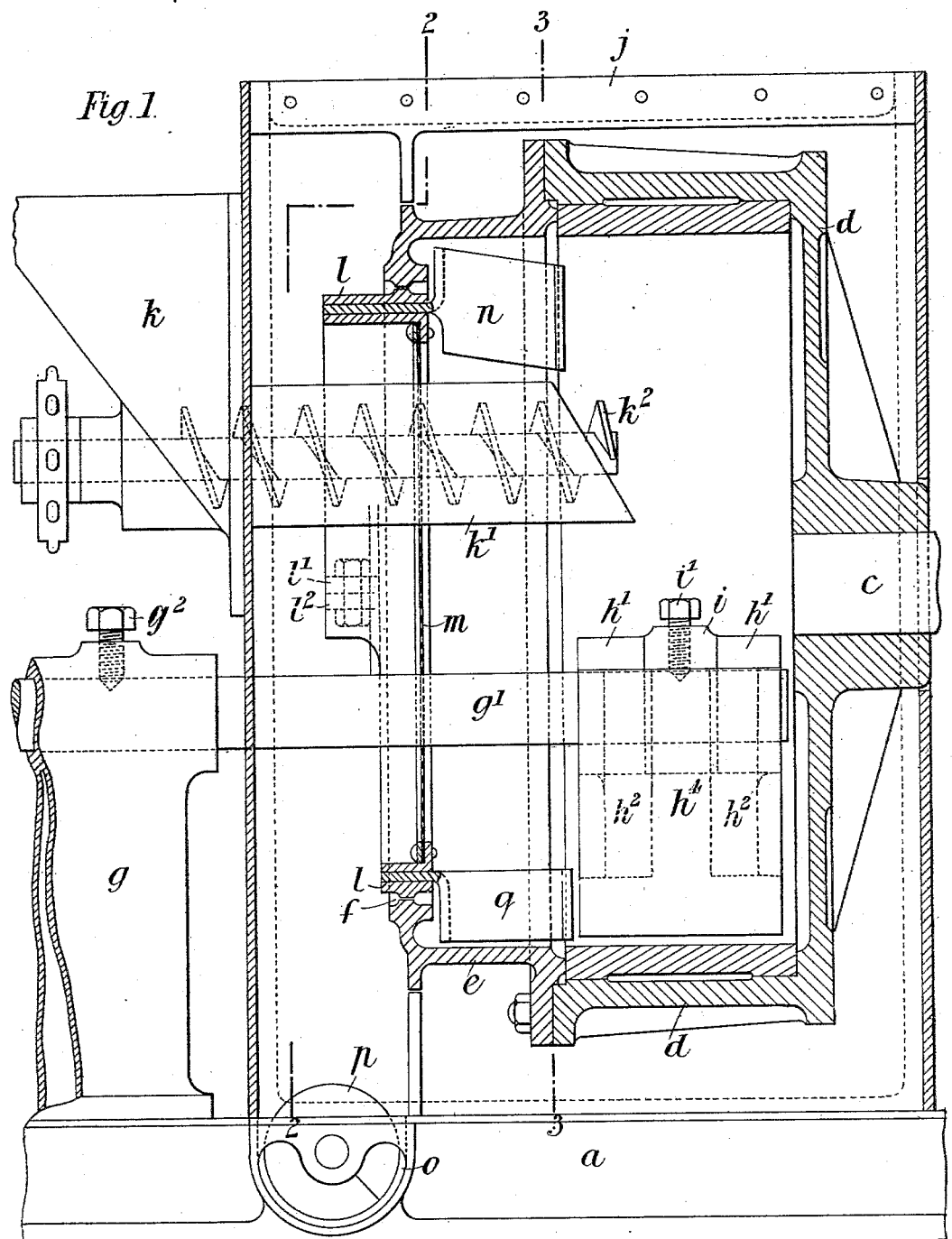
Figure 3:
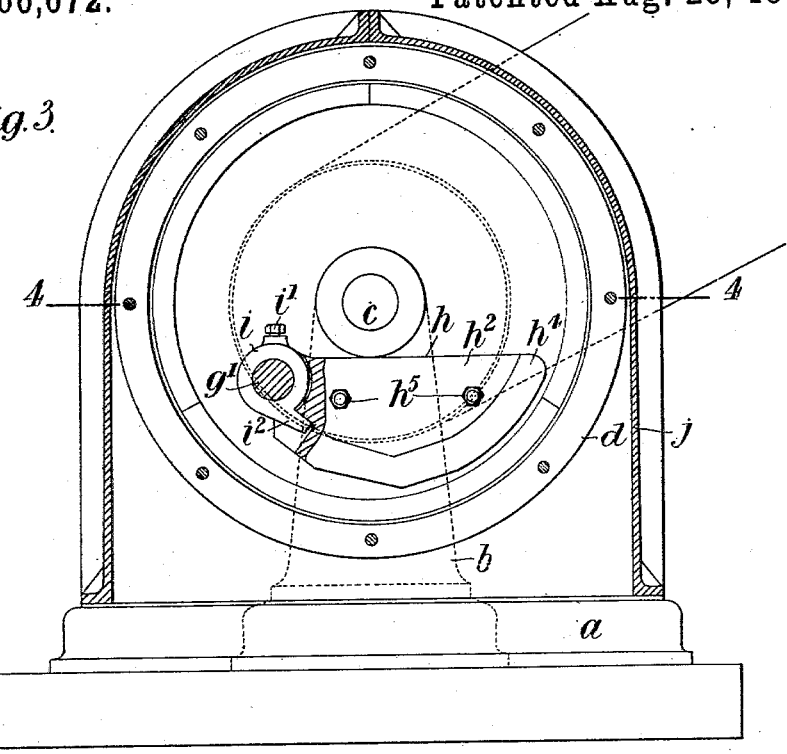
Figure 2:
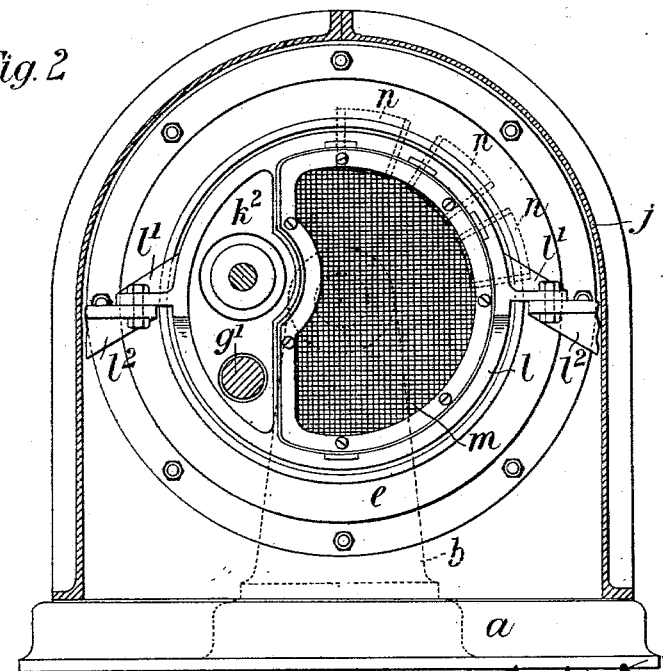
Figure 5:
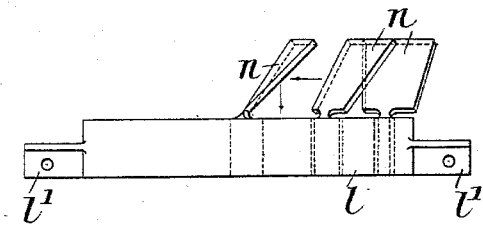
Figure 4:
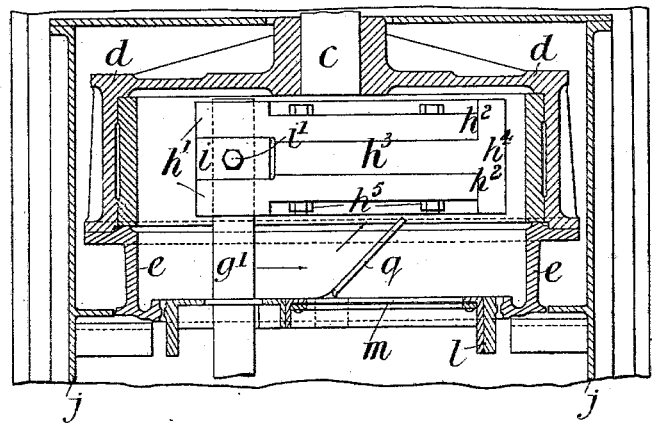

Figure 1 is an elevation partly in vertical section of our improved crushing apparatus. Fig. 2 is a section on the line 2 2, Fig. 1, drawn to a reduced scale; and Fig. 3 is a section on the line 3 3, Fig. 1, drawn to the same scale as Fig. 2. Fig. 4 is a section on the line 4 4, Fig. 3; and Fig. 5 is a plan view illustrating the arrangement of the deflectors.

$a$ is the bed-plate of the apparatus, having upon it a standard $b$, in which is journaled a shaft $c$, to which motion is imparted by any suitable means—for instance, by means of a belt and pulley, as shown in Fig. 3.

$d$ is a cylinder, preferably of cast iron or steel, mounted upon the spindle $c$ and closed at the end adjacent to the spindle. The other end of the cylinder, which is open, is provided with a removable cover $e$, having a large central aperture $f$, the said cover being fixed to and rotating with the cylinder.

The cylinder is lined upon its inner periphery with renewable segmental plates or with a ring which can be readily renewed when desired.

A standard $g$ is fixed in proximity to the revolving cylinder, and to this said standard a stud $g'$ is fitted, one end of which stud projects through the aperture $f$ in the removable cover of the cylinder and carries the heavy hammer-block $h$ in close proximity to the inner lining of the cylinder. The said hammer-block is provided with an eye or boss $h'$, and may be in one or several pieces. In the drawings it is represented as having two separate cheeks $h^2$ $h^2$, between which is clamped a flange $h^3$, by means of which the renewable working face $h^4$ of the hammer-block is fixed through the medium of bolts $h^5$ $h^5$. The eye or boss $h'$ fits loosely on the stud $g'$, and a collar $i$ between the two sides of the boss is rigidly attached to the stud $g'$ by a set-screw $i'$, which collar thus serves to retain the hammer-block in position upon the stud. The collar $i$ is provided with a projection $i^2$, which, as the stud $g'$ is rigidly fixed in the standard $g$ by set-screws $g^2$, serves to support the hammer-block at any suitable distance from the inner lining of the cylinder.

The lower or under side of the working face of the hammer-block is polygonal or curved, as desired, or both, and, as shown, corresponds in part with the curve of the inner lining of the cylinder and in part recedes from the said lining to form a wedge-shaped space between the said face and the inner lining.

The working face $h^4$, instead of being detachable, may be formed in one piece with the hammer-block.

The position of the working face $h^4$ relatively with the lining of the cylinder $d$ can be adjusted by means of the set-screws $g^2$, which enter a groove in the stud $g'$.

The weight of the hammer-block can be regulated for varying materials, or grades of the same, and the velocity of rotation of the cylinder can be varied in any reasonable degree to give blows of greater or less force, as may be desired.

The hammer-block vibrates radially to the stud upon which it is mounted under the impact of the material carried against the said block, and the said vibration produces a hammer-like action, which assists in a thorough reduction of the material under treatment. It will be understood, however, that in these vibrations the hammer-block does not move nearer to the cylinder-casing than is permitted by the projection $i^2$.

The cylinder is covered over with a suitable fixed casing $j$ to prevent the escape of dust, and a hopper $k$ is fixed to the casing for the reception of the material to be treated, the said material being conveyed from the hopper through a short length of tube $k'$ by a spiral or other conveyer $k^2$ and dropped into the revolving cylinder behind the hammer-block.

The removable cover, before mentioned, which is flanged and bolted to the accessible end of the cylinder, is of special form, and projects beyond the cylinder in an axial direction. The aperture $f$ in this cover is truly bored and has within it a fixed ring $l$, carried by lugs $l'$ $l'$, bolted to brackets $l^2$ $l^2$ on the casing $j$. The said fixed ring is fitted with a screen $m$.

$n$ $n$ are the plates for deflecting the pulverized material, the said plates being within the cover portion $e$ of the crusher and serving to direct the material which is carried round by the cover, under the centrifugal action, against the screen. The said plates are carried by the ring $l$, as shown clearly in Fig. 5.

Several screens which are made interchangeable and of any desired mesh for grading the material passing through them may be provided. The screened material falls into a suitable collecting-trough $o$ within and below the casing, the said trough being fitted with a spiral or other conveyer $p$, which delivers the finished material through a spout or aperture in the said trough.

In some cases we find it advantageous to combine with our crushing apparatus a deflector-plate $q$ (or plates) at the lower side, as shown in Fig. 4, which deflecting-plate is also carried by the ring $l$, and serves to direct the material, which does not pass through the screen, beneath the hammer-block for further reduction.

The machine is operated by feeding the hopper with rough material which passes by means of the conveyer $k^2$ into the revolving cylinder $d$. It is carried round at a high velocity and under the hammer-block $h$, and the impact, together with the crushing action in the wedge-shaped space, is sufficient to break down any hard material, which is afterward further reduced between the face of the block and the inner lining, where the said face is in closer proximity to the said lining.

The material when pulverized gathers or is collected upon the inner circumference of the projecting part of the cover of the cylinder, and is thrown off by the deflecting-plates $n$ $n$ and directed upon the screen $m$. The material, after passing through the screen, collects in the trough $o$ and is delivered by the conveyer $p$ to the outside of the casing $j$ and there dealt with as may be desired.

The machine as described is susceptible of modification generally. For instance, two separate and distinct cylinders, as described, with all the accessories of hammer-blocks, segmental plates, studs, standards, screens, and minor details may be mounted upon one and the same spindle, journaled as described, the whole forming a double machine.

Having now particularly described and ascertained the nature of our said invention and in what manner the same is to be performed, we declare that what we claim is—

1. In an ore-crusher the combination of a rotary cylinder, a hammer-block, a screen secured in the discharge-opening of said cylinder and stationary deflectors, having their discharge ends extending toward said screen for directing the pulverized material against the screen, substantially as described.

2. In an ore-crusher the combination with a rotary cylinder, and a hammer-block, of a stationary screen in the discharge-opening of said cylinder, and deflecting-plates fixed in a position immediately adjacent to the screen, for directing the pulverizing material against the same, substantially as described.

3. In an ore-crusher, the combination with a rotary cylinder, open at one end and a hammer-block, of a fixed frame mounted in the open end of said cylinder, a screen fastened upon said frame, and diagonally-arranged plates, rigidly secured to said frame for directing the crushed material against the screen, substantially as described.

4. In an ore-crusher, the combination with a rotary cylinder open at one end, and a hammer-block, of a stationary frame secured at the open end of the cylinder, a screen mounted upon said frame, and a stationary deflecting-plate secured to said frame for directing insufficiently-crushed material beneath the hammer-block, substantially as described.

5. In an ore-crusher the combination with a rotary cylinder open at one end, and a hammer-block, of a stationary frame secured at the open end of the cylinder, a screen mounted upon said frame, stationary deflectors, secured to said frame for directing the crushed material against the screen and a stationary deflector, secured to said frame for directing insufficiently-crushed material beneath the hammer-block, substantially as described.

6. In an ore-crusher the combination with a rotary cylinder open at one end, of a fixed stud extending into said cylinder, a bifurcated hammer-block loosely mounted upon the said stud and a collar upon said stud for holding the hammer-block in place, substantially as described.

7. In an ore-crusher, the combination with a rotary cylinder, of a fixed stud extending into said cylinder, a hammer-block pivotally mounted on said stud and a device rigidly secured to said stud and directly engaging a part of said hammer-block for limiting its downward movement, substantially as described.

8. In an ore-crusher, the combination with a rotary cylinder, of a fixed stud extending into said cylinder, a hammer-block pivotally mounted on said stud and a device adjustably secured to said stud and engaging a part of said hammer-block for limiting its downward movement, substantially as described.

9. In an ore-crusher the combination with a rotary cylinder, of a fixed stud extending into said cylinder a hammer-block pivotally mounted on said stud and a device adjustably secured to said stud and engaging a part of said hammer-block for limiting its downward movement and means for adjusting the said stud rotatably with relation to its support, substantially as described.

10. In an ore-crusher, the combination with a rotary crusher, and a hammer-block, of a stationary frame secured in the discharge-opening of said cylinder, a screen mounted upon said frame, a series of angularly-disposed deflectors adjacent to the top of said screen for directing the crushed material against the same, and an angularly-disposed deflector adjacent to the bottom of the screen for directing insufficiently-crushed material beneath the hammer-block, substantially as described.

ROBERT HANDLEY DUNDEE.
FREDERICK GEORGE JONES.

Witnesses:
RALPH CHEACH,
JOHN E. BOUSFIELD,